United States Patent [19]
Dedek

[11] Patent Number: 4,466,513
[45] Date of Patent: Aug. 21, 1984

[54] RAILROAD BRAKE SHOE-BRAKE BEAM ASSEMBLY

[75] Inventor: Tomasz W. Dedek, Wheaton, Ill.

[73] Assignee: AMSTED Industries Incorporated, Chicago, Ill.

[21] Appl. No.: 328,903

[22] Filed: Dec. 9, 1981

Related U.S. Application Data

[63] Continuation of Ser. No. 136,798, Apr. 3, 1980, abandoned.

[51] Int. Cl.$^3$ ............................................. F16D 65/04
[52] U.S. Cl. ........................................................ 188/243
[58] Field of Search ............... 188/244, 243, 242, 247, 188/250 F, 234

[56] References Cited

U.S. PATENT DOCUMENTS

| | | | |
|---|---|---|---|
| 1,117,366 | 11/1914 | Gallagher | 188/247 |
| 1,328,594 | 1/1920 | Sargent | 188/247 |
| 2,107,521 | 2/1938 | Busch | 188/243 |
| 2,885,037 | 5/1959 | Wilson | 188/247 |
| 3,077,957 | 2/1963 | Arrosmith | 188/243 |
| 3,237,733 | 3/1966 | Kettering et al. | 188/243 |

FOREIGN PATENT DOCUMENTS

| | | | |
|---|---|---|---|
| 963292 | 11/1964 | France | 188/143 |
| 804963 | 11/1958 | United Kingdom | 188/243 |

*Primary Examiner*—Hiram H. Bernstein
*Attorney, Agent, or Firm*—Fred P. Kostka

[57] ABSTRACT

A railroad brake shoe comprising a composition friction element prepared for engagement with a wheel of a railroad car includes an arcuate-shaped metal backing plate to which the friction element is supportively joined. The backing plate includes a semicircular-shaped attaching bracket which has a pair of brake shoe key windows formed in an upper and a lower member of the bracket. Each window has an angularly offset outer sidewall which forms part of a gripping edge. The attaching bracket of the brake shoe is fitted between spaced carrier lugs formed in a brake shoe head located at each end of a brake beam associated with the railroad car. To secure the brake shoe to the brake head a brake shoe key is inserted in a vertical recess formed in the brake head so as to pass through the key windows in the brake shoe. The key engages the gripping edges in the brake shoe attaching bracket to form a wedging action which inhibits movement of the key during use.

3 Claims, 8 Drawing Figures

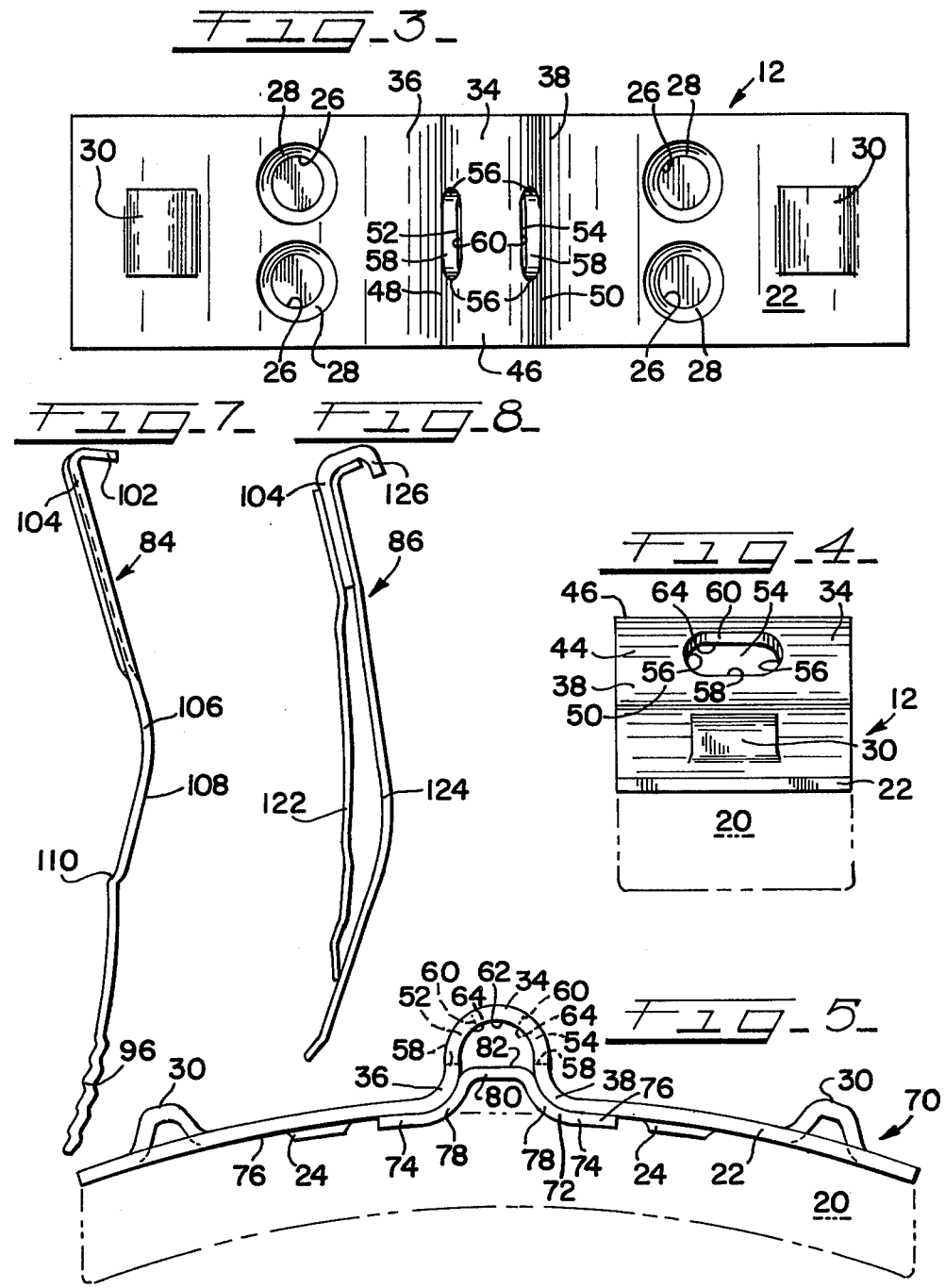

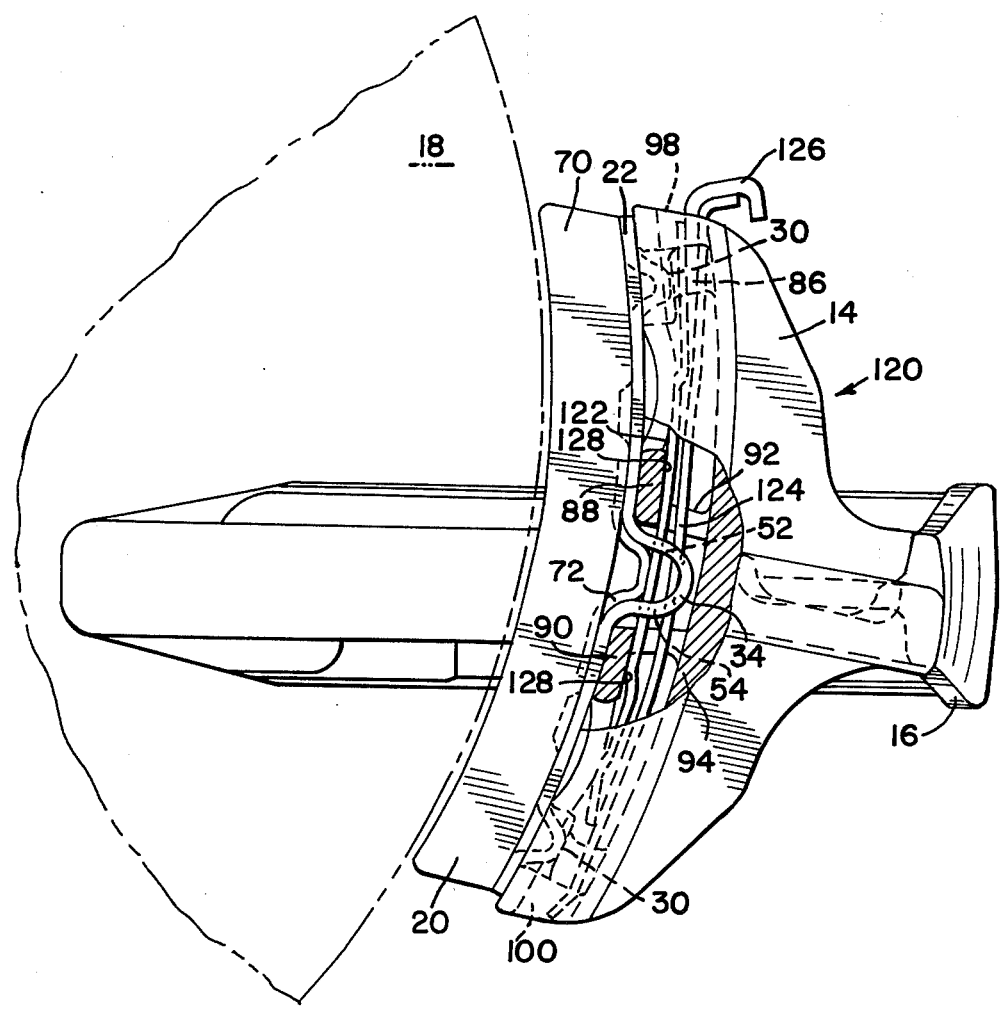

RAILROAD BRAKE SHOE-BRAKE BEAM ASSEMBLY

This is a continuation of application Ser. No. 136,798, filed Apr. 3, 1980, now abandoned.

BACKGROUND OF THE INVENTION

1. Field of Invention

This invention relates to railroad brake shoes and more particularly to means formed as part of the brake shoe which allows the brake shoe to be readily assembled to a brake beam of the railroad car while at the same time inhibiting disassembly which may inadvertently occur during operation of the railroad car.

2. Prior Art

Brake shoes which are detachably connected to a brake beam of a railroad car are well known.

Typically, the brake shoe includes a composition friction element carried by a metal backing plate having an arcuate configuration. Either integrally formed as part thereof or attached to an outer side of the backing plate is an outwardly protruding trapezoidal-shaped attaching bracket. The attaching bracket is insertable between vertically spaced carrier lugs formed in a brake head carried at ends of a conventional railroad car brake beam. The brake head has certain standardized features and dimensions as established by the Mechanical Division of the Association of American Railroads (AAR) to allow interchangeability between the brake shoes and brake beams made by different manufacturers.

As established by the AAR, the brake shoe attaching bracket contains a pair of spaced brake shoe key windows which extend from the backing plate and into an outer vertical wall of the attaching bracket. A brake shoe key, also of standard design, is insertable through a vertical recess formed in the brake beam brake head so as to pass through the windows in the brake shoe attaching bracket. By this insertion, the brake shoe is assembled to the brake head.

One standard brake shoe key has a slightly radiused middle portion which engages with the attaching bracket vertical wall. This engagement is promoted by a slight flexing of the key upon its insertion into the brake head. A bottom of the key may include a series of serrations which interface with the brake head to inhibit upward movement of the key after assembly.

This assembly of the brake shoe to the brake head by means of the brake shoe key has proved troublesome. Because of the location of the assembly, removal of the key to allow disassembly of a worn shoe is awkward. Once the key is removed, the replacement brake shoe must be precisely held to allow key reinsertion. Additionally, because of round-the-clock railroad operation, shoe replacement must be done during periods of severe weather and at night. When a key is not fully inserted or the brake head becomes unduly worn, interaction between the shoe and the brake head has a tendency to walk the brake shoe key upward to further loosen the assembly. With a loose assembly, the brake shoe and even the wheel can be damaged upon application of the brakes.

SUMMARY OF THE INVENTION

A brake shoe-brake beam assembly of this invention includes a brake shoe having a composition friction element affixed to a metal backing plate. The friction element and backing plate have an arcuate configuration to complementarily engage with a rim portion of a railroad car wheel.

The backing plate is of an integral construction formed with an outwardly extending attaching bracket so dimensioned to fit between the spaced carrier lugs formed as part of each brake head of a typical railroad brake beam.

The attaching bracket includes an upper and lower brake shoe key window. These windows are defined by aligned inner sidewalls and outer sidewalls which are angularly offset. The bracket may include a pan-shaped reinforcing plate attached to an inner side of a backing plate.

With the brake shoe backing plate attaching bracket positioned between the carrier lugs of the brake beam brake head, a brake shoe key may be inserted through a top opening in the brake head to pass behind the brake head carrier lugs and through the brake shoe key windows. With the keys fully inserted, the brake shoe is secured to the brake beam and ready for use in service.

The railroad brake shoe-brake beam assembly of this invention has several advantages over the known arrangements.

First, standard components may be used, for example, the brake shoe key and brake head of the brake beam conform to AAR standards.

Secondly, the brake shoe backing plate may be formed as one piece allowing the use of high production manufacturing techniques. Where a reinforcing pan is also included, its offset configuration allows it to be readily located and then spot welded to the backing plate without the need for special jigs or tooling.

Last and of primary significance is the configuration of the brake shoe key windows in the brake shoe backing plate attaching bracket. The angularly offset outer sidewalls form in part gripping edges to produce a wedging action with the key. This wedging action inhibits movement of the key. Preventing movement of the key particularly when the key has not been fully inserted is of major significance since the key is thus prevented from walking upward to produce a loose assembly. By this invention, the brake shoe remains properly secured to the brake head even when the key is not properly inserted.

DESCRIPTION OF THE DRAWINGS

FIG. 3 is a plan view of the brake shoe as generally seen along the line 3—3 of FIG. 2.

FIG. 4 is an end elevational view of the brake shoe as seen generally along the line 4—4 of FIG. 2.

FIG. 5 is a side elevational view of a further embodiment of a brake shoe usable in this invention.

FIG. 6 is a side elevational view of another brake shoe-brake beam assembly of this invention in partial section wherein the brake shoe of FIG. 5 and a second standard brake shoe key as shown in FIG. 8 are incorporated.

FIG. 7 is a detailed side elevational view of the first brake shoe key used in the assembly of FIG. 1.

FIG. 8 is a detailed side elevational view of the second brake shoe key used in the assembly of FIG. 6.

DESCRIPTION OF THE PREFERRED EMBODIMENT

Figure 1:
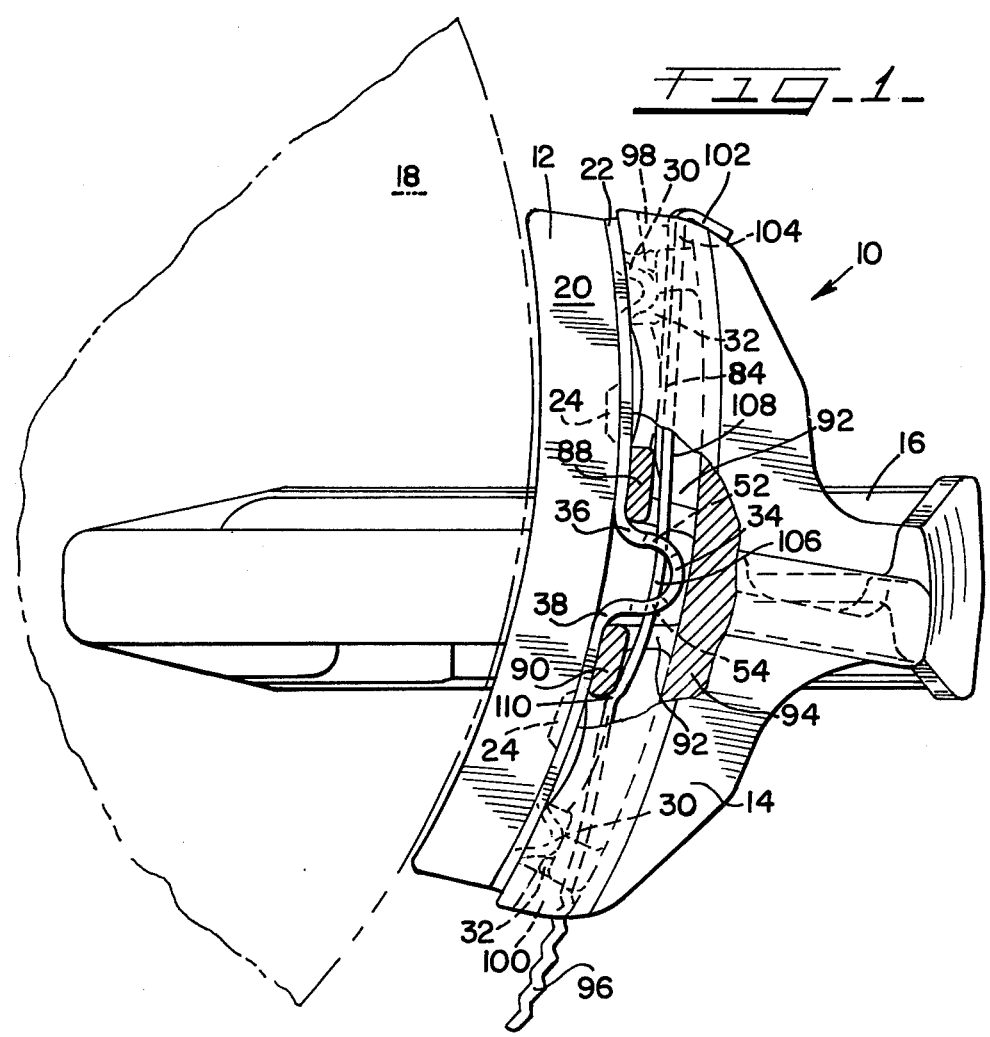
FIG. 1 is a side elevational view of a brake shoe-brake beam assembly of this invention in partial section wherein a first standard brake shoe key as shown in FIG. 7 is incorporated.

A railroad car brake shoe-brake beam assembly of this invention is shown generally in FIG. 1 and designated 10. The assembly 10 is formed between a brake shoe 12 and a brake head 14. As is understood by those familiar with this art, a pair of such spaced heads 14 are carried at ends of an elongated brake beam 16. The brake beam 16 in turn is located on one side of one pair of wheelsets (not shown) of a railroad car truck (not shown). As seen in FIG. 1, the brake head 14 and the attached brake shoe 12 are positioned to selectively engage a wheel 18 of the wheelset.

Figure 2:
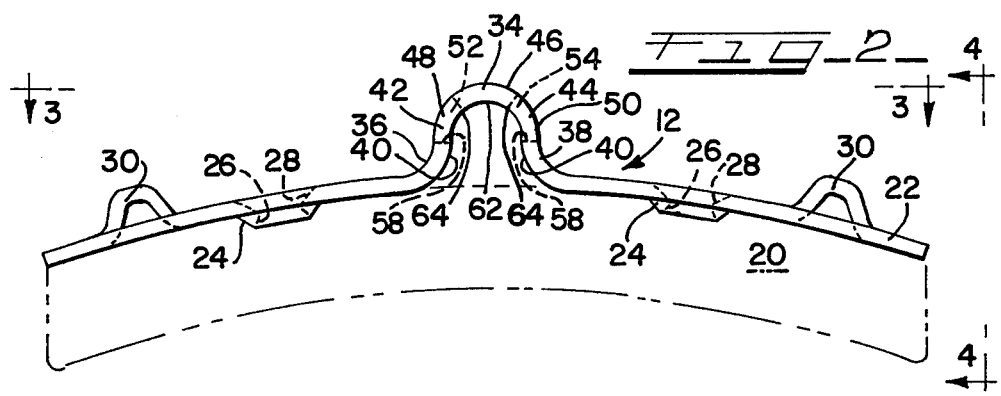
FIG. 2 is a side elevational view of the brake shoe of FIG. 1.

The brake shoe 12 is shown in greater detail in FIGS. 2, 3 and 4. There are two general types of brake shoes in use today. An older type includes a cast iron friction element for engagement with the wheel 18. The new type shoe 12 utilizes a composition friction element 20. The element 20 typically includes a rubber based binder having disposed therethrough friction materials such as iron grit, a reinforcing agent such as asbestos fibers and friction modifiers such as lead powders.

The composition friction element 20 is affixed to an arcuate-shaped metal backing plate 22 with a suitable mastic. Engagement between the element 20 and the plate 22 if further enhanced by a series of spaced inwardly projecting embossments 24. Each embossment 24 is formed with a hole 26 which allows the composition of the element 20 to flow during molding and curing of the element 20 so as to fill a recess 28 formed in the backing plate 22 opposite each embossment 24. The composition in the recesses 28 helps to hold the element 20 to the backing plate 22.

Because the composition friction element 20 has a substantially higher coefficient of friction than its earlier cast iron counterpart, each backing plate 22 used with the element 20 includes a pair of spaced rejection lugs 30. These lugs 30 prevent the brake shoe 12 from being assembled to a brake beam which does not have a complementary indentation 32 formed as part of the brake head 14. Because higher braking forces are used with the lower coefficient of friction cast iron brake shoe, the rejection lugs 30 insure that the brake shoe 12 cannot be misapplied. The wheel 18 could be severly damaged if the shoe 12 were forced against such with the force ordinarily used with cast iron shoes.

The backing plate 22 further includes an attaching bracket 34 which projects outwardly. The bracket 34 is in part defined by an upper and a lower reverse radiused corner 36, 38. It should be understood that the brake shoe 12 is invertible and thus "upper" and "lower" are used merely to more conveniently describe the embodiment. Outer ends 40 of the reverse radiused corners 36, 38 join an upper and lower leg 42, 44 of a semicircular cap 46. The upper leg 42 of the cap 46 joins the upper reverse radiused corner 36 to form an upper bracket member 48 while the lower cap leg 44 joins the lower reverse radiused corner 38 to form lower bracket member 50.

In each bracket leg 48, 50 is a respective upper and lower brake shoe key window 52, 54. Each window 52, 54 has an elongated configuration defined by radiused end walls 56 and an inner and an outer sidewall 58, 60. The inner sidewalls 58 of the upper and the lower key windows 52, 54 are vertical and substantially aligned with the joinder of the outer end 40 of the reverse radiused corners 36, 38 and the legs 42, 44 of the cap 46. The outer sidewalls 60, on the other hand, are angularly offset so as to converge toward an axis of the cap 46. The outer sidewalls 60 of each window 52, 54 join an inner surface 62 to form a pair of gripping edges 64.

A second embodiment 70 of the brake shoe is shown in FIG. 5 wherein like structural elements are identified with like reference numbers. The brake shoe 70 also includes the friction element 20 fastened to the backing plate 22. The plate 22 further includes a reinforcing pan 72. The pan 72 comprises two outer leg portions 74 formed on a radius to fit in a complementary manner against an inner surface 76 of the backing plate 22. An inner end of each leg 74 is formed with a complementary radius portion 78 to fit against the upper and lower reverse radiused corners 36, 38 of the attaching bracket 34. The radiused portions 78 are joined by a cross member or web 80 having a flat outer surface 82 positioned to align with the inner sidewalls 58 of the upper and lower key windows 52, 54.

As best understood by viewing FIG. 1, the brake shoe 12 is joined to the brake head 14 of the brake beam 16 by use of a retractable brake shoe key to form the brake shoe-brake beam assembly 10. Two such standard keys are shown in FIGS. 7 and 8 and designated 84, 86. As seen in FIG. 1, the assembly 10 is formed by first placing the brake shoe attaching bracket 34 between a pair of upper and lower spaced carrier lugs 88, 90 formed integrally as part of the brake head 14. The lugs 88, 90 are separated by a passage 92 from an outer rear portion 94 of the brake head 14.

A lower serrated end 96 of the key 84 is first inserted through a top opening 98 in the brake head 14. The opening 98 allows the key 84 to move into a vertical recess (not shown) formed within the brake head. This recess joins the passage 92. As the key 84 moves down into the passage 92, it passes through the upper and lower key windows 52, 54 in the brake shoe attaching bracket 34 and then through a bottom opening 100 in the brake head 14. Downward movement of the key 84 is limited by a flanged handle portion 102 which engages a top of the brake head 14.

As seen in FIG. 1, the key 84 is slightly flexed with the serrated end 96 engaged with an end wall of the bottom brake head opening 100 and an upper end 104 of the key 84 engaged with a like end wall of the top brake head opening 98. The key 84 includes a radiused middle part 106 having ends which are flexed against the upper and lower brake head carrier lugs 88, 90 to force an outer surface 108 of the key 84 against the pair of gripping edges 64 in the brake shoe attaching bracket 34. Thus the brake shoe 12 is held firmly in place against the lugs 88, 90 and movement of the key 84 is inhibited by a wedging action of the gripping edges 64. Note that the semicircular cap 46 of the attaching bracket 34 allows the key radiused middle part 106 to expand fully therein without contact. Thus, the wedging action remains unimpeded.

Note that the key 84 also includes an offset 110 which locks below the lower carrier lug 90 when the key 84 is fully inserted. If the key 84 were not fully inserted or the lugs 88, 90 become unduly worn, the gripping edges 64 of each key window 52, 54 still remain in contact with the outer surface 108 of the key 84 to inhibit movement of the key 84.

As seen in FIG. 6, a further brake shoe-brake beam assembly 120 is formed with the key 86 and the brake shoe 70. The key 86 comprises an inner strap 122 and an outer strap 124 spaced apart at the upper end 104 of the key 86 by a bracket handle member 126. When the key 86 is inserted through the upper and lower key windows 52, 54 in the brake shoe attaching bracket 34, the inner strap 122 is flexed against the brake head lugs 88, 90 to force the outer strap 124 against the gripping edges 64 inhibiting movement of the key 86. Like the other embodiment, the gripping edges 64 produce a wedging action. In particular, the edge 64 of the upper key window 52 inhibits upward movement of the key 86 while the lower key window edge 64 inhibits downward movement.

The inner sidewalls 58 of the key windows 52, 54 and the cross member 80 of the reinforcing pan 72 are so positioned to proximately align with an inner surface 128 of the lugs 88, 90. Thus, movement of the key 86 is additionally inhibited by frictional engagement therebetween. The key window inner sidewalls 60 and reinforcement cross member 80 also insure a porper compressive fit between the brake shoe bracket gripping edges 64 and the key outer strap 124 even when the inner surface 128 of the brake head carrier lugs 88, 90 become excessively worn. Excess wear of the carrier lug inner surfaces 128 otherwise would allow the key straps 122, 124 to move toward a normal or uncompressed state so as to reduce the effectiveness of the wedging action of the gripping edges 64 in preventing movement of the key 86.

While various modifications may be suggested by those versed in the art, it should be understood that I wish to embody within the scope of the patent warranted hereon, all such modifications as reasonably and properly come within the scope of my contribution to the art.

What is claimed is:

1. A railroad brake shoe for use with a braking system of a railroad vehicle, said brake shoe comprising, a friction element, unitary plate means connected to said friction element to provide support thereto, said unitary plate means having an attaching means projecting outwardly from said plate means on a side opposite said friction element, said attaching means including a pair of lengthwise spaced upstanding members located substantially mid-way of said unitary plate means, each of said upstanding members having a window including an upper wall inclined at an acute angle, each said wall being inclined in opposing relationship to provide a pair of downwardly facing opposing edges, a key extending through said opening and being bowed so that the upper surface contacts and grippingly engages in substantially linear contact said downwardly facing window wall edges to thereby resist lengthwise movement of said key relative to said brake shoe.

2. A railway brake shoe as defined in claim 1 wherein said attaching means if formed integral with said plate means and said upstanding members are connected by a bight portion, and said inclined walls are located adjacent the junctures of said upstanding members and said bight portion, and wherein each of said windows is sized to permit insertation of said key therethrough without interference until said bowed section engages said opposing upper wall edges.

3. A railway brake shoe as defined in claim 2 wherein a strap extends along the underside of said bowed section of said key to cause said key to flex toward said opposing upper wall window edges.

* * * * *